(12) United States Patent
Day et al.

(10) Patent No.: US 6,298,178 B1
(45) Date of Patent: Oct. 2, 2001

(54) STRAY LIGHT ABSORPTION

(75) Inventors: Ian Day, Old Headington; James Stuart McKenzie, Uxbridge, both of (GB)

(73) Assignee: Bookham Technology PLC, Abingdon Oxfordshire (GB)

( * ) Notice: Subject to any disclaimer, the term of this patent is extended or adjusted under 35 U.S.C. 154(b) by 0 days.

(21) Appl. No.: 09/076,743

(22) Filed: May 13, 1998

(30) Foreign Application Priority Data

Nov. 29, 1997 (GB) .................................... 9725205

(51) Int. Cl.⁷ ....................................... G02B 6/12
(52) U.S. Cl. .............................. 385/14; 385/129
(58) Field of Search ......................... 385/14, 31, 123, 385/129–132

(56) References Cited

U.S. PATENT DOCUMENTS 5,093,884  3/1992  Gidon et al. ................. 385/132 D

FOREIGN PATENT DOCUMENTS

| 0 080 945 A2 | 8/1983 | (EP) . |
| 0 397 337 A2 | 11/1990 | (EP) . |
| 0 598 966 A1 | 1/1994 | (EP) . |
| 0 617 301 A1 | 9/1994 | (EP) . |

OTHER PUBLICATIONS

R.A. Soref et al., "Electrooptical Effects in Silicon," The Journal of Quantum Electronics, vol. QE–23, No. 1, Jan. 1987: pp. 123–129.

Patent Abstracts of Japan, vol. 16, No. 266, Jun. 16, 1992: p. 1371.

Primary Examiner—John D. Lee
Assistant Examiner—Sarah N Song
(74) Attorney, Agent, or Firm—Fleshner & Kim, LLP

(57) ABSTRACT

An integrated optical circuit formed on an optically conductive substrate having light absorbing means comprising one or more doped areas (1) of the substrate where the doping concentration is greater than that of areas of the substrate forming the optical circuit (2) to absorb stray light in the substrate which is not guided by components of the optical circuit.

22 Claims, 2 Drawing Sheets

STRAY LIGHT ABSORPTION

BACKGROUND OF THE INVENTION

1. Field of the Invention

This invention relates to a method of absorbing stray light in an integrated optical circuit and to an integrated optical circuit comprising light absorbing means for absorbing stray light.

2. Description of the Related Art

In the design of integrated optical circuits there is often a need to deal with light which is not guided by the components forming the circuit. This stray light, which can arise from many sources, such as fibre or laser couplers, scattering from waveguide couplers and bends or from scattering beam dumps, can have a severe impact on the performance of devices which employ these components. The stray light in the optical chip can enter devices on the chip, and output fibres and may severely limit the performance of these devices.

Conventional methods of dealing with this problem include physically arranging devices on an integrated optical chip such that stray light cannot enter sensitive parts of the chip and the use of isolation trenches to keep stray light away from certain parts of the chip.

The imitation of these approaches is that they do not remove the stray light from the integrated optical chip, but instead attempt to minimise the problem of having stray light within the chip.

SUMMARY OF THE INVENTION

According to a first aspect of the invention, there is provided a method of absorbing stray light in an integrated optical circuit formed on an optically conductive substrate comprising the step of doping selected areas of the substrate so as to increase the absorption of light which is not guided by components of the optical circuit in those areas.

According to a second aspect of the invention, there is provided an integrated optical circuit formed on an optically conductive substrate comprising light absorbing means for absorbing stray light in the substrate, the light absorbing means comprising one or more doped areas of the substrate where the doping concentration is greater than that of areas of the substrate forming the optical circuit to absorb stray light in the substrate which is not guided by components of the optical circuit.

Other features of the invention will be apparent from the following description and from the subsidiary claims of the specification.

BRIEF DESCRIPTION OF THE DRAWINGS

The invention will now be further described, merely by way of example, with reference to the accompanying drawings, in which.

DESCRIPTION OF THE PREFERRED EMBODIMENTS

It is known that free charge carriers arising from ionised impurity atoms (i.e. doping atoms) change the refractive index and increase the linear optical absorption coefficient of silicon at wavelengths commonly used in telecommunications, i.e. 1310 nm and 1550 nm. Detailed measurements have been published in the literature (see for example R. A.Soref and B. R.Bennett "Electro-optical Effects in Silicon". IEEE Journal of Quantum Electronics QE-23 (1) p.123 1987) for common impurity atoms such as Boron (a p-type dopant) and Phosphorous (an n-type dopant). This effect is used in integrated optical switches and transducers by arranging for free charge carriers to be injected into a waveguide upon the application of a voltage across the waveguide.

In the present invention this effect is used to provide light absorbing means in an optical chip to absorb stray light in the chip.

By doping selected areas of the chip, stray light in the chip can be removed by the process of free charge carrier absorption so dealing directly with the problem of stray light and the limitations this can cause on device performance.

The doped areas may be formed in a variety of locations such as adjacent a coupling between a light source or optical fibre and a waveguide, adjacent a bend in a waveguide, adjacent a junction in a waveguide or a coupling between waveguides, adjacent a beam dump and between a light source and a light sensor. In general, the doped regions are positioned so as to prevent light from any source of stray light reaching another component in the circuit which is susceptible to such light.

Figure 1:
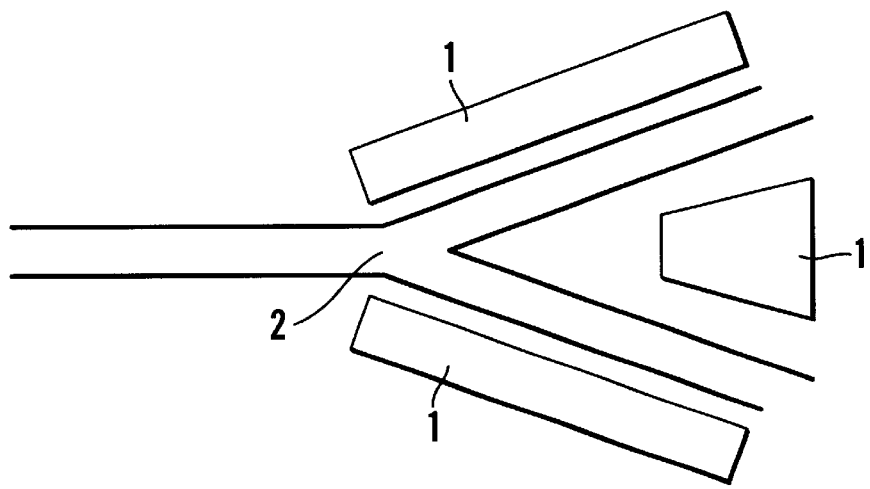
FIG. 1 is a schematic diagram illustrating the use of doped areas adjacent a Y-junction in a waveguide in accordance with the invention.

FIG. 1 illustrates the use of doped regions 1 adjacent a Y-junction 2 in a waveguide. The doped regions 1 are preferably formed in areas where they will absorb a substantial amount of the stray light emanating from the junction, e.g. adjacent the outer edges of the arms of the Y-junction and in the area between the arms of the Y-junction.

Figure 2:
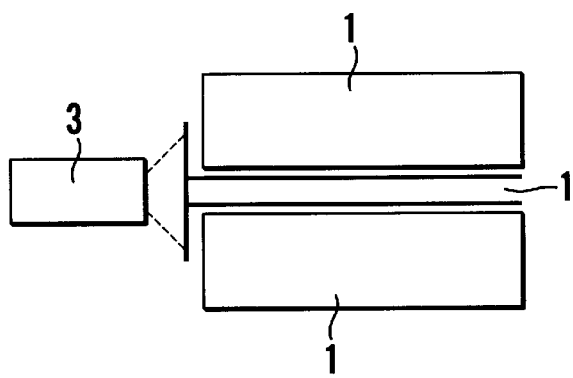
FIG. 2 is a schematic diagram illustrating the use of doped areas adjacent a coupling between a laser diode and a waveguide in accordance with the invention.

FIG. 2 illustrates the use of doped regions 1 adjacent a coupling between a laser diode 3 and a waveguide 4. The laser diode 3 is aligned with the waveguide 4 so the majority of the light emitted by the diode is directed along the waveguide. Nevertheless, a certain amount of light diverging from the laser diode 4 does not enter the waveguide 3 and produces stray light in the optical chip. The doped regions 1 are formed on either side of the waveguide in positions where they will intercept and absorb a substantial proportion of this stray light. A similar arrangement may be used where the light source is an optical fibre instead of the laser diode 3.

The doped regions 1 shown in FIGS. 1 and 2 may typically be about 20 microns wide and about 100 microns long.

Figure 3:
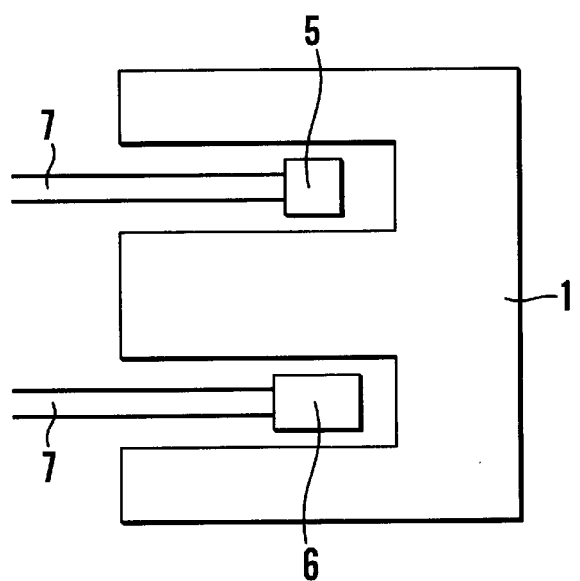
FIG. 3 is a schematic diagram illustrating the use of a doped area between a light source and a light detector in accordance with the invention.

FIG. 3 illustrates the use of a doped region 1 between a laser diode 5 and a photo diode 6, e.g. on a transceiver chip. The doped region 1 is positioned so as to intercept stray light which may find its way from the laser diode 5 to the photo diode 6. The doped region 1 is formed so as to encircle or surround the laser diode 5 and/or the photo diode 6, except in the region(s) where light from the diode(s) is directed into or received from a waveguide 7, so as to optically isolate the diode(s) apart from the designated light exit or entrance. By isolating the photo diode 6 from the light source 5 in this way, its sensitivity is increased. In an alternative arrangement (not shown) the doped region may simply comprise an elongate band between the laser diode 5 and the photo diode 6. The various sections of the doped region 1 in FIG. 3 would also typically be about 20 microns wide and 100 microns long.

The doping concentration required and the size of the doped regions will depend on many factors such as the type of substrate used, the type of dopant used, and the performance requirements of the device.

Figure 4:
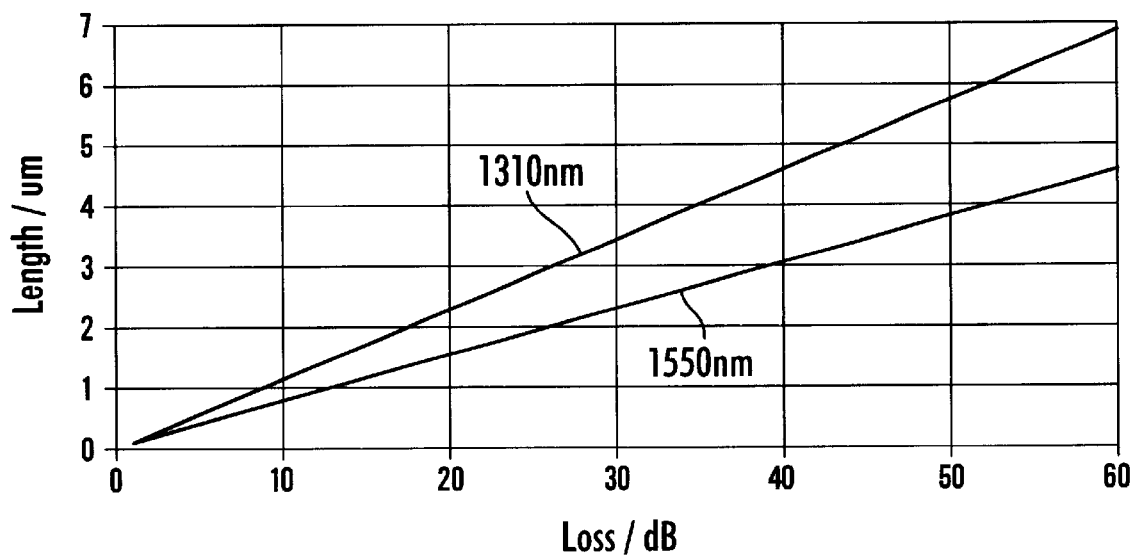
FIG. 4 is a graph showing the length of doped area against the absorption loss for two given wavelengths, for a particular concentration of n-type doping.

FIG. 4 shows a graph of the length of doped area through which the stray light passes and the absorption loss for the two wavelengths 1310 nm and 1550 nm for a p doping concentration of $1.6 \times 10^{20}$ cm$^{-3}$ of phosphorous atoms in a silicon substrate. This graph has been calculated using data published in the literature referred to above. The graph shows that with a doping length of 7 microns (for the wavelength 1310 nm) and 10 microns (by extrapolation, for the wavelength 1550 nm) a significant level of absorption (in excess of 60 dB) occurs.

The graph also shows that even a short length of dopant, e.g. about 1 micron, produces a useful degree of absorption (about 10 dB).

Figure 5:
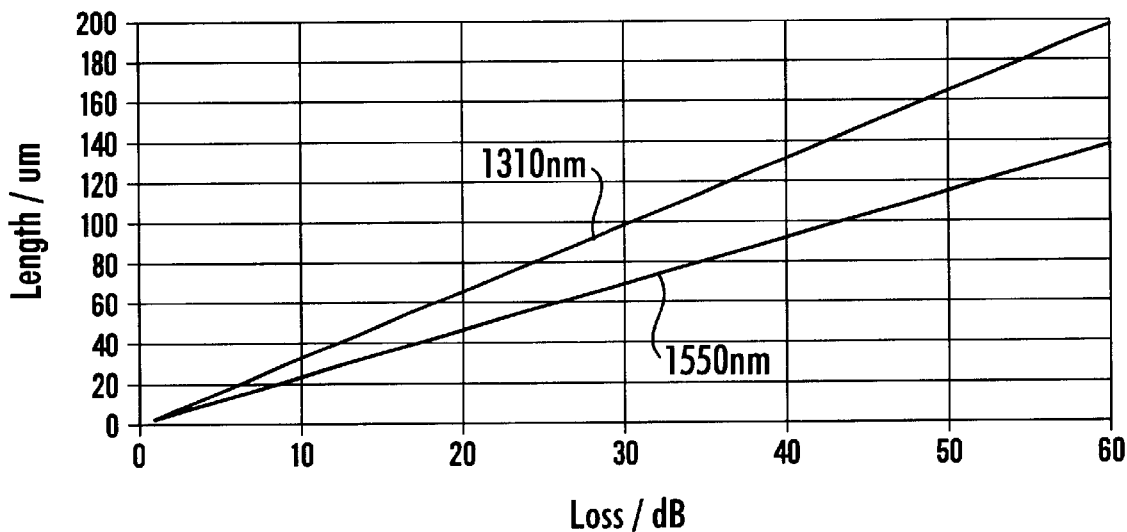
FIG. 5 is a graph showing the length of doped area against the absorption loss for two given wavelengths for a particular concentration of p-type doping.

FIG. 5 shows a similar graph using a lower doping concentration of $1.6 \times 10^{19}$ cm$^{-3}$ of boron atom. This example does not provide such an efficient absorber as that in FIG. 4 (due to the lower concentration of the dopant and the lower absorption per unit volume of boron compared to phosphorous) but, nevertheless, shows that a useful level of absorption, e.g. 10 dB or more, can be achieved using a doping region having a length of between 20 and 40 microns.

Other n and p-type dopants may be used in place of or in addition to phosphorous and boron.

The examples given above relate to a silicon substrate, e.g. a silicon-on-insulator (SOI) chip. Such chips are manufactured to given specifications for the purity of the silicon to enable efficient devices to be formed therefrom. The "background" impurity level of the silicon in such a device is typically in the order of $10^{15}$ cm$^{-3}$. The doping concentration of the doped regions 1 should preferably be at least $10^{16}$ cm$^{-3}$ and most preferably at least $10^{19}$ or $10^{20}$ cm$^{-3}$.

The doping level used should preferably be sufficient to enable absorption of at least 10 dB, and preferably 50 dB or more, to be achieved using doping regions less than 200 microns in length and preferably 40 microns or less and most preferably 20 microns or less.

With a silicon-on-insulator chip, the silicon layer typically has a thickness of 2–8 microns and rib waveguides typically having a width of about 4 microns, are formed by etching a recess in the silicon layer on each side of the rib. The doped regions 1 formed on either side of the rib, e.g. as shown in FIGS. 1 and 2, may then be formed by diffusing dopant into the recess on either side of the rib. In other cases, e.g. when the doped region is adjacent a photo diode, e.g. as shown in FIG. 3, it is formed by diffusing into the silicon layer adjacent the diode without the prior formation of a recess.

The doped regions are typically formed by subjecting the relevant regions to an atmosphere containing the dopant atoms at an elevated temperature. Following this, the device is heated again in an oxygen atmosphere to diffuse the dopant further into the chip and form an oxide layer over the chip. It is obviously desirable for the dopant to extend through the entire depth of the optical layer, e.g. the silicon layer in an SOI substrate, to avoid the possibility of stray light escaping underneath the doped regions. The concentration of dopant will generally vary with depth in the optical layer, e.g. by a factor of 10 per micron of depth, and in the preferred arrangement the minimum level of doping (usually at the bottom of the layer 1) should be of a sufficient level to provide the required degree of absorption.

The doped regions may, in many cases, be formed close to the relevant source of stray light to maximise the amount of light absorbed. The regions may, for instance, be formed less than 5 microns from the relevant source, e.g. a rib waveguide etc. as shown in FIGS. 1 and 2, but should not be formed so close as to interfere with the operation of the relevant component.

Such doped regions can conveniently be formed at the same time as other components of the circuit are fabricated, e.g. modulators, and their position can be accurately determined by standard photolithographic techniques.

In some applications it may be possible to form doped regions over the entire area of a chip occupied by the integrated optical circuit apart from the areas in which the components of the optical circuit themselves are formed in order to maximise the absorption of stray light. The doped regions will, however, increase the electrical conductivity of the chip so in cases where it is not desirable to create an electrical path between components of the optical circuit, isolated doping regions such as those described above should be used.

The doped regions preferably all comprise the same type of dopant, i.e. either n-type or p-type, so as to avoid forming unwanted diodes between n and p-type regions. For the same reason, the doped regions used for absorption should not be formed too close to the n and p-type doped regions provided for other purposes.

It will be appreciated that the use of doped regions as light absorbing means, as described above, enables the problems caused by stray light in the optical chip to be significantly reduced. This enables optical circuits to be designed independently of stray light considerations and enables the available space on a chip to be used much more efficiently and so enable more compact devices to be fabricated.

What is claimed is:

1. A method of reducing stray light in an optical circuit formed on an optically conductive substrate, comprising:
   determining areas of the substrate outside of the optical circuit through which stray light can propagate; and
   doping the determined areas of the substrate using a dopant selected from an n-type dopant and a p-type dopant to form doped determined areas, wherein the doped determined areas effect free carrier scattering to yield free carrier absorption to increase the absorption of stray light in the doped determined areas.

2. The method as claimed in claim 1, wherein the substrate comprises silicon.

3. The method as claimed in claim 1, wherein the determined areas are doped by diffusing or implanting dopants into the substrate so that a concentration of dopant exceeds $10^{16}$ cm$^{-3}$ throughout the thickness of the substrate.

4. The method as claimed in claim 1, wherein the determined areas are doped by diffusing or implanting dopants into the silicon substrate so that a concentration of dopant in the determined areas exceeds $10^{19}$ cm$^{-3}$ throughout the thickness of the substrate.

5. The method as claimed in claim 1, wherein the doping step comprises doping areas of the substrate adjacent to a coupling between a light source and a waveguide so as to increase the absorption of stray light from the light source and/or the waveguide.

6. The method as claimed in claim 1, wherein the doping step comprises doping areas of the substrate adjacent to a coupling between an optical fiber and a waveguide so as to increase the absorption of stray light from the optical fiber and/or the waveguide.

7. The method as claimed in claim 1, wherein the doping step comprises doping areas of the substrate adjacent to a bend in a waveguide so as to increase the absorption of stray light from the bend in the waveguide.

8. The method as claimed in claim 1, wherein the doping step comprises doping areas of the substrate adjacent to a junction in a waveguide so as to increase the absorption of stray light from the junction.

9. The method as claimed in claim 1, wherein the doping step comprises doping areas of the substrate adjacent to a coupling between waveguides so as to increase the absorption of stray light from the coupling.

10. The method as claimed in claim 1, wherein the doping step comprises doping areas of the substrate adjacent a beam dump so as to increase the absorption of stray light from the beam dump.

11. The method as claimed in claim 1, wherein the doping step comprises doping areas of the substrate around a light source so as to increase the absorption of stray light from the light source.

12. The method as claimed in claim 1, wherein the doping step comprises doping areas of the substrate between a light source and a light sensor so as to increase the absorption of stray light from the light source.

13. The method of claim 1, further comprising:
fabricating the optical circuit on the optically conductive substrate, wherein the doping the determined areas is performed after the fabricating the optical circuit on the optically conductive substrate.

14. The method of claim 1, wherein the absorption of the stray light in the doped determined areas is not dependent on wavelength.

15. The method of claim 1, wherein the doped determined areas do not interfere with operations of the optical circuit.

16. The method of claim 1, wherein the doped determined areas are discontinuous relative to the optical circuit.

17. An optical device, comprising:
an optically conductive substrate;
an optical circuit formed on the optically conductive substrate; and
a light-absorbing doped area in the optically conductive substrate for absorbing stray light propagating outside of the optical circuit, wherein the light-absorbing doped area uses dopant selected from an n-type dopant and a p-type dopant, and wherein the absorption of the stray light in the light-absorbing doped area is independent of wavelength so that all wavelengths are absorbed by free carrier scattering.

18. The device of claim 17, wherein the light-absorbing doped area comprises phosphorous.

19. The device of claim 17, wherein a dopant concentration in the light-absorbing doped area is in excess of $10^{20}$ cm$^{-3}$.

20. The device of claim 17, wherein a concentration of the dopant used as the absorber is greater than a concentration of dopant in the optical circuit.

21. The device of claim 17, wherein the light-absorbing doped area comprises one of phosphorous as the n-type dopant and boron as the p-type dopant, and wherein the light-absorbing doped area effects free carrier scattering.

22. An optical device, comprising:
an optically conductive substrate;
an optical circuit formed on the optically conductive substrate; and
a light-absorbing doped area in the optically conductive substrate for absorbing stray light propagating outside of the optical circuit, wherein the light-absorbing doped area uses dopant selected from an n-type dopant and a p-type dopant, and wherein the light-absorbing doped area effects free carrier scattering to perform the absorption of the stray light in the light-absorbing doped area.

* * * * *